R. V. JONES.
Horse Hay-Fork.
No. 72,860. Patented Dec. 31, 1867.
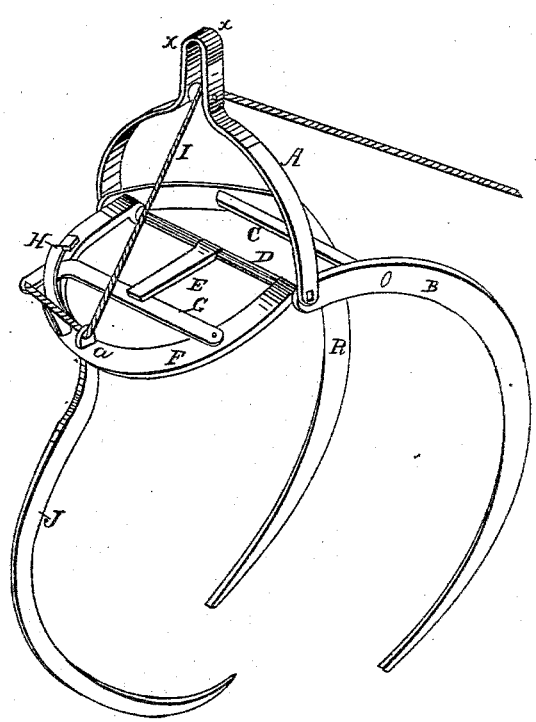

United States Patent Office.

R. V. JONES, OF CANTON, OHIO.

Letters Patent No. 72,860, dated December 31, 1867.

---

IMPROVEMENT IN HORSE HAY-FORKS.

---

*The Schedule referred to in these Letters Patent and making part of the same.*

---

TO ALL WHOM IT MAY CONCERN:

Be it known that I, R. V. JONES, of Canton, in the county of Stark, and in the State of Ohio, have invented certain new and useful Improvements in Horse Hay-Forks; and do hereby declare that the following is a full, clear, and exact description thereof, reference being had to the accompanying drawings, and to the letters of reference marked thereon.

In the annexed drawings, A represents a metallic strap or bar, bent so as to form a loop, or its equivalent, at its centre, as seen at x x, with its two ends separated and connected together by means of a shaft or rod, D. B B represent two hooked teeth, which are connected together by a round, C. The shaft or bar D passes through the upper ends of these teeth, and, being square at each end, and being riveted after being inserted, the strap A is firmly and rigidly secured to the teeth B. F represents a semicircular or curved bar, which has its ends bent around the shaft D, so as to bring it to it. On the under side and centre of the bar F is secured the upper end of a hooked tooth or prong, J. G represents a cross-piece, which lies upon the bar F, having one end pivoted to said bar, and the other playing loose in a keeper, H. a represents a small lug or projection, upon the upper side of the bar F, in which an eye is formed. A cord, I, is secured to the loose end of the cross-piece G, and then runs through the eye in lug a, and then up over a cross-pin in the loop of the strap A, and then continued as long as may be desirable in order to operate the machine. E represents an arm, which is secured to the shaft D, and which extends out, so that its outer end will catch upon the cross-piece G when desirable.

In using this machine, the hook, which is secured to the lower end of the rope of the block and tackle to be used, is caught in the loop of bar A at x x. The prongs or teeth B B and J are separated so as to receive between them the hay to be drawn up. After a sufficient amount has been placed between these prongs or teeth they are closed until the arm E can be caught upon top of the cross-piece G, which is pushed toward it, for this purpose. This keeps the teeth or prongs closed. The hay is now drawn up in the machine by the block and tackle, and, when in the desired position to be deposited, the operator draws the cord I until he moves the cross-piece G from under the end of the arm E. As soon as this occurs, the prongs or teeth separate and allow the hay to drop from their embrace. The machine is again lowered and filled in a similar manner, and drawn up and emptied, as has been described.

Having thus fully described my invention, what I claim as new, and desire to secure by Letters Patent, is—

1. The use of the cross-bar G, in combination with its arm E, as and for the purpose specified.

2. The strap A, with its prongs or teeth B, in combination with the bar F, with its prong J and cross-bar G, and the arm E and cord I, arranged and used as and for the purpose set forth.

In testimony that I claim the foregoing, I have hereunto set my hand, this 23d day of April, 1867.

R. V. JONES.

Witnesses:
HIRAM THURSTON,
W. W. CLARK.